July 10, 1928.  1,676,680

J. BETHENOD
SYSTEM FOR THE ELECTRIC TRANSMISSION OF SIGNALS
ALONG LINES FOR POWER DISTRIBUTION
Filed Jan. 4, 1923

Inventor
Joseph Bethenod.
per [signature].
Attorney

Patented July 10, 1928.

1,676,680

UNITED STATES PATENT OFFICE.

JOSEPH BETHENOD, OF PARIS, FRANCE.

SYSTEM FOR THE ELECTRIC TRANSMISSION OF SIGNALS ALONG LINES FOR POWER DISTRIBUTION.

Application filed January 4, 1923, Serial No. 610,735, and in France February 2, 1922.

This invention relates to systems for the electric transmission of signals applicable to distribution services with a neutral wire and primarily consists in provision of a reactance coil between the neutral wire and the grounding of each transformer station, with a view to feeding receiving relays placed with the subscribers by means of a current source of relatively high frequency connected to the terminals of the reactance coil, the impedance of the latter being negligible at the periodicity of the distribution.

Figure 1:
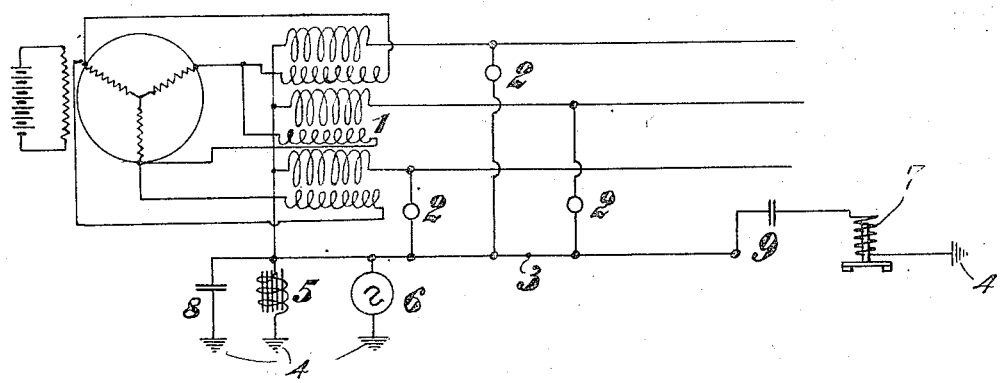
Figure 2:
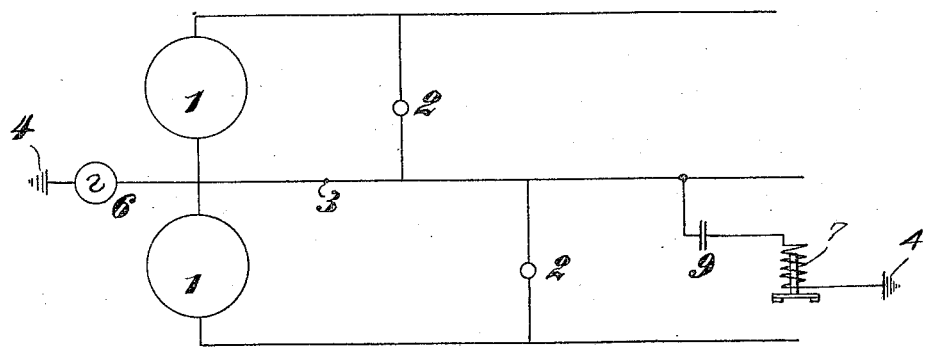

In the accompanying drawings,

Figure 1 diagrammatically indicates an application of system according to the present invention, and, Figure 2 diagrammatically illustrates a modification.

Especially in services for the distribution of energy by three-phase currents (as indicated in Figure 1) there is often provided, for the low voltage circuits feeding the lamps, motors and various similar apparatus (2) a fourth wire or neutral wire (3) insulated in the same way as other conductors, but grounded by a connection carefully made between the earth 4 and the neutral point of the secondary windings of each transformer and disposed in each sub-station supplying a certain number of subscribers. The purpose of this grounding is to protect the low voltage circuit against any accidental contact between the primary and the secondary windings of the transformer. In accordance with the present invention, this grounding (4) is effected by means of a reactance coil (5), protection against accidental discharge remaining completely efficacious, upon condition that the impedance of the said coil be low at the periodicity of the service. The ends of its winding are connected to a source of alternating current of sufficiently high frequency (6) to enable its output through the said winding to be negligible. By connecting receiving apparatus (7), relay or the like, which are sensitive only to this relatively high frequency current, between the neutral wire and the ground (4) (water main, gas main or the like) at the subscribers' stations, it is possible to cause these apparatus to be operated at will by controlling them from the transformer station, without the addition of special wires. A condenser (9) may be placed in series with the receiver (7) in order to increase the syntony and to prevent any flow of current at the periodicity of the distribution.

A capacity (8), suitably adjusted, may be mounted in parallel with the reactance coil in order to increase, as already known, the stopping effect of this joint-impedance; the condenser can alternatively be connected across an additional winding (10) coupled to the coil (5) as shown in Figure 2.

The arrangement described can be applied to all systems of distribution comprising a neutral wire.

The core of the reactance coil will, furthermore, be preferably so dimensioned as to be saturated in case of intense current circulating between the ground and the neutral wire, at the periodicity of the distribution. In this way, the impedance of the coil is reduced automatically when a short circuit occurs between the high tension lines, the windings 1 and the ground.

What I claim is:—

1. In a system for signaling over transmission systems having an insulated neutral conductor, means for connecting a source of relatively high frequency current between said neutral conductor and ground, means between said neutral conductor and ground affording a low impedance path for currents of power frequency but a high impedance path for currents of signaling frequency, and signal receiving means responsive to high frequency currents connected between the neutral conductor and ground.

2. In a system for signaling over transmission systems having an insulated neutral conductor, a source of relatively high frequency current between said neutral conductor and ground, an iron core inductance coil between said neutral conductor and ground, said coil affording a low impedance path for currents of power frequency, but forming a high impedance path for the currents of signalling frequency, and signal receiving relays connected between the neutral conductor and ground and in series with a condenser increasing the response to high frequency currents and the insulation of neutral conductor for power frequency currents.

3. A system as claimed in claim 1, in which the core of the reactance coil is so dimensioned, as to be saturated in case of an increase current circulating between the neutral wire and the ground at the periodicity of the electric supply, in order to reduce the reactance of the said periodicity.

JOSEPH BETHENOD.